United States Patent
Bernard (10) Patent No.: US 11,306,679 B2
(45) Date of Patent: Apr. 19, 2022

(54) DEGASSING TUBE AND EJECTION CONE FOR A TURBINE ENGINE, AS WELL AS TOOL FOR ASSEMBLY THEREOF

(71) Applicant: SAFRAN AIRCRAFT ENGINES, Paris (FR)

(72) Inventor: Samuel Louis-Marie Bernard, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 607 days.

(21) Appl. No.: 15/769,060

(22) PCT Filed: Oct. 25, 2016

(86) PCT No.: PCT/FR2016/052765
§ 371 (c)(1),
(2) Date: Apr. 17, 2018

(87) PCT Pub. No.: WO2017/077219
PCT Pub. Date: May 11, 2017

(65) Prior Publication Data
US 2018/0313268 A1 Nov. 1, 2018

(30) Foreign Application Priority Data
Nov. 4, 2015 (FR) .................................. 1560563

(51) Int. Cl.
*F02K 1/04* (2006.01)
*F02C 7/06* (2006.01)

(52) U.S. Cl.
CPC .................. *F02K 1/04* (2013.01); *F02C 7/06* (2013.01); *F05D 2220/323* (2013.01);
(Continued)

(58) Field of Classification Search
CPC ..... F02K 1/04; F02K 1/36; F02K 1/80; F01D 25/18; F01D 25/28; F01D 25/243;
(Continued)

(56) References Cited

U.S. PATENT DOCUMENTS

2014/0158458 A1* 6/2014 Malot ................... F02K 1/04
181/222
2015/0300206 A1* 10/2015 Sultana .............. F16L 3/1222
415/208.1

FOREIGN PATENT DOCUMENTS

FR 1103224 A 10/1955
FR 2997997 A1 * 5/2014 ............. F01M 13/00
(Continued)

OTHER PUBLICATIONS

International Search Report received for PCT Patent Application No. PCT/FR2016/052765, dated Feb. 14, 2017, 5 pages (2 pages of English Translation and 3 pages of Original Document).
(Continued)

Primary Examiner — Gerald L Sung
Assistant Examiner — Rene D Ford
(74) Attorney, Agent, or Firm — Womble Bond Dickinson (US) LLP (57) ABSTRACT

The invention relates to an aircraft turbine engine module (10), comprising a degassing tube (14) and an ejection cone (12). The tube and the cone comprise centring means engaging together. The invention also relates to a locating and adjusting tool for assembling said module.

5 Claims, 9 Drawing Sheets

(52) U.S. Cl.
CPC .. *F05D 2230/644* (2013.01); *F05D 2250/131* (2013.01); *F05D 2250/132* (2013.01); *F05D 2260/30* (2013.01); *F05D 2260/605* (2013.01); *F05D 2260/608* (2013.01); *F05D 2260/609* (2013.01)

(58) Field of Classification Search
CPC .. F02C 7/06; F05D 2230/64; F05D 2230/642; F05D 2260/609; F05D 2260/608; F05D 2220/323; F05D 2230/644; F05D 2250/131; F05D 2250/132; F05D 2260/30; F05D 2260/605
See application file for complete search history.

(56) References Cited

FOREIGN PATENT DOCUMENTS

| | | |
|---|---|---|
| WO | 2011/117560 A2 | 9/2011 |
| WO | 2014/072626 A2 | 5/2014 |
| WO | 2014/072643 A2 | 5/2014 |

OTHER PUBLICATIONS

International Written Opinion received for PCT Patent Application No. PCT/FR2016/052765, dated Feb. 14, 2017, 9 pages (4 pages of English Translation and 5 pages of Original Document).
International Preliminary Reporton Patentability received for PCT Patent Application No. PCT/FR2016/052765, dated May 17, 2018, 12 pages (6 pages of English Translation and 6 pages of Original Document).

\* cited by examiner

DEGASSING TUBE AND EJECTION CONE FOR A TURBINE ENGINE, AS WELL AS TOOL FOR ASSEMBLY THEREOF

TECHNICAL FIELD

The present invention notably relates to a degassing tube and ejection cone for a turbine engine, in particular, for an aircraft. It also relates to a unit comprising these two systems, as well as a tool and a method for assembly of this unit.

PRIOR ART

The prior art notably comprises the documents WO-A2-2014/072643, WO-A2-2014/072626 and FR-A-1 103 224.

A turbine engine, such as a turbofan engine, typically comprises an air inlet comprising a blower whose outgoing airflow divides into an airflow which penetrates the motor and forms a hot flow or primary flow and an airflow which flows around the motor and which forms a cold flow or secondary flow.

The motor typically comprises, from upstream to downstream, in the direction of the gas flow, at least one compressor, a combustion chamber, at least one turbine, and an ejection nozzle in which the combustion gases exiting the turbine and forming the primary flow are mixed with the secondary flow.

At the downstream end, the turbine engine comprises an ejection cone of the primary flow or even of the mixed primary-secondary flow. This cone has an extended form of which the upstream end of larger diameter is fixed to an element of the turbine engine, like a casing.

In typical fashion, a degassing tube longitudinally traverses the ejection cone. The function of this tube is to extract and to channel the air discharged from the oil by the oil separators of the turbine engine and to eject it into the atmosphere by the downstream end of the tube, substantially situated at the point of the downstream end of the ejection cone.

The document WO-A1-2011/117560 describes a turbine engine degassing tube.

The degassing tube has an extended form and can comprise, at a longitudinal end, means of fixing to an element of the turbine engine. The degassing tube is, in this case, cantilevered on this element, which is not satisfactory for retention reasons during dynamic stresses.

Furthermore, while the ejection cone has a non-axisymmetric form and has, for example, upstream and downstream ends which are not aligned, the assembly unit comprising the tube and the cone is complex. The tube is mounted on the turbine engine beforehand and once the cone is mounted on the turbine engine, the tube is no longer accessible. In addition to the difficulties linked to the form of the cone, the relative position of the tube with regard to the cone can vary by a few millimetres due to manufacturing tolerances of the parts.

The present invention proposes a solution to solve at least one part of the problems mentioned above, in a simple, efficient and cost-saving manner.

DESCRIPTION OF THE INVENTION

The invention proposes a degassing tube for a turbine engine of an aircraft, this tube having an extended form and comprising at a longitudinal end means of fixing to an element of the turbine engine, the tube also comprising at its outer periphery and at a distance from said end first centring means configured to co-operate with second centring means of an ejection cone of the turbine engine designed to be traversed by said tube characterised in that said first centring means are formed by an allowance of said tube and have a polygonal peripheral form in cross section and comprise a annular row of external support surfaces.

The invention also ensures the centring and the support of the tube inside the cone.

The tube according to the invention can comprise one or several of the following features, either in isolation from each other or in combination with each other:
  said external support surfaces are flat,
  said first centring means have a hexagonal peripheral form in cross section.

The invention also relates to an ejection cone for a turbine engine of an aircraft, this cone having an extended form and comprising at the longitudinal end means of fixing to an element of the turbine engine, the cone also comprising at its inner periphery and at distance from said end second centring means configured to co-operate with first centring means of a degassing tube of the turbine engine designed to traverse said cone, the cone comprising at least one annular stiffener at its inner periphery, said second centring means being fixed in a detachable manner to said stiffener, characterised in that said second centring means comprise an annular row of tabs configured to be radially supported on said first centring means.

The cone according to the invention can comprise one or several of the following features, either in isolation from each other or in combination with each other:
  the cone comprises at least one annular stiffener at its inner periphery, said second centring means being fixed in a detachable manner to said stiffener,
  said tabs are carried by a first disc which is fixed to a second disc, a third disc being inserted and squeezed between said first and second discs and being fixed to said stiffener, said first, second and third discs extending around the longitudinal axis of the cone,
  said first and second discs are fixed together by screws which traverse first holes or slots of said third disc, and said third disc is fixed to said stiffener by screws which traverse second holes or slots of said second disc inserted between said third disc and said stiffener, said first and second holes or slots being configured as having the larger transversal dimensions than said corresponding screws in order to allow for relative displacements in a radial direction between said first and second discs, on the one hand, and said third disc and stiffener, on the other hand.

The present invention also relates to a unit of a turbine engine of an aircraft, comprising a tube and a cone as described above.

The present invention also relates to a turbine engine, of an aircraft in particular, characterised in that it comprises this unit.

The present invention also relates to a locating and adjusting tool for the assembly of a unit as described above, in that it comprises:
  a first ring configured to be applied and fixed to an element of the turbine engine and to also be, in a sequenced manner (in other words, it is capable of being fixed to two pieces but when it is fixed to one piece, it is not fixed to the other piece), applied and fixed to an end with a larger diameter than said cone, said first ring being configured to be traversed by said tube,
  a second ring configured to be traversed by said tube and to be accommodated in said cone, ring connecting struts, which extend between the rings and are fixed to the latter, these struts being configured to be accommodated in said cone, and a third ring configured to be traversed by said tube and to carry, in a detachable and sequenced manner, a tubular finger comprising first centring means substantially identical to the first centring means of said tube, said third ring being fixed to said second ring by means which allow for adjustment of the misalignment of the axes of said second and third rings.

Advantageously, said third ring comprises an inner cylindrical centring surface which is configured to co-operate with an external cylindrical surface of said finger and, in a sequenced manner, with an external cylindrical surface of a tubular sleeve, this sleeve, preferably divided into sectors, comprising an inner cylindrical surface in polygonal, preferably hexagonal, form, in cross section, which is complementary to that of said first centring means of said tube.

Lastly, the present invention relates to an assembly method of a unit of the type described above, using the tool described above, which includes the steps of:

a) fixing said tube to a first element of the turbine engine and fixing said first ring of the tool to a second element of the turbine engine, so that said second and third rings are traversed by said tube, said fixing means between said second and third rings not being tightened.

b) mounting said sleeve around said tube and inside said third ring, then tightening said fixing means between said second and third rings which themselves are not tightened, c) releasing the tool from said first element of the turbine engine, fixing said finger to said third ring, and inserting the tool into said cone, so that said finger co-operates with said second centring means, which are mounted idly in a radial direction facing said cone, then fixing said first ring to said cone, d) rigidly fixing said centring means facing said cone, and e) mounting said cone around said tube, so that said first and second centring means co-operate together, then fixing said cone to said first element of the turbine engine.

DESCRIPTION OF THE FIGURES

The invention will be better understood and other details, features and advantages of the invention will become apparent on reading the following description by way of a non-limiting example and referring to the appended drawings in which.

DETAILED DESCRIPTION

Figure 1:
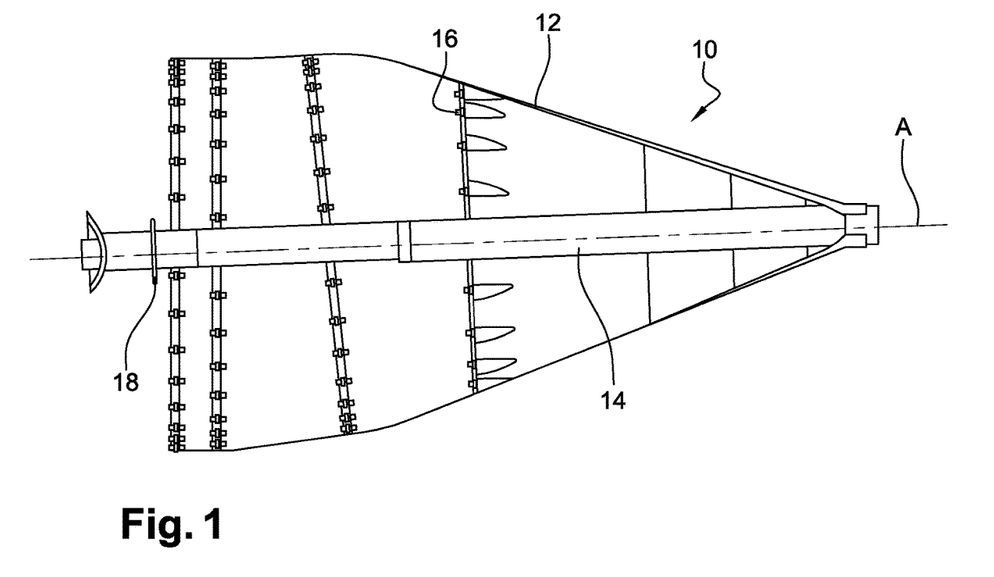
FIG. 1 is a schematic view in axial section of a unit of a turbine engine, comprising a degassing tube and an ejection cone.
Figure 2:
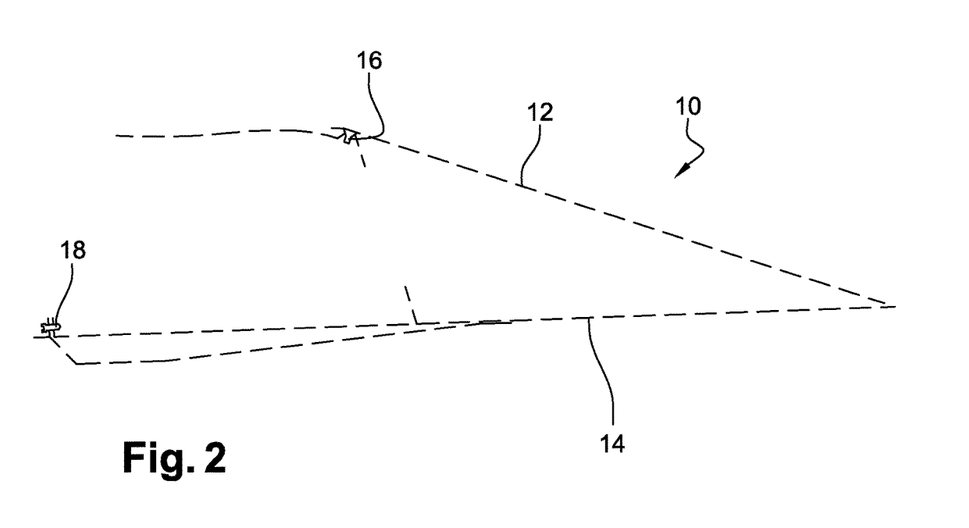
FIG. 2 is a half-schematic view in axial section of a unit of a turbine engine as in FIG. 1.

FIGS. 1 and 2 are referred to first, which represent an ejection or downstream unit 10 of a turbine engine, comprising an ejection cone 12 extending around a degassing tube 14.

The cone 12 has an extended form of axis A, of which the upstream end of larger diameter is fixed to an intermediate element of the ejection unit, itself fixed to a casing of the turbine engine, for example by means of an annular flange 16.

The degassing tube 14 extends along the axis A and thus also has an extended form. It comprises fixing means, such as a flange 18, at its upstream longitudinal end, to an element of the turbine engine.

This type of technology has some drawbacks and the present invention aims to solve this, at least in part, particularly due to the centring means and the support of the downstream end of the tube inside the cone.

The following figures illustrate an embodiment of the invention.

Figures 3, 4, 5, 6:
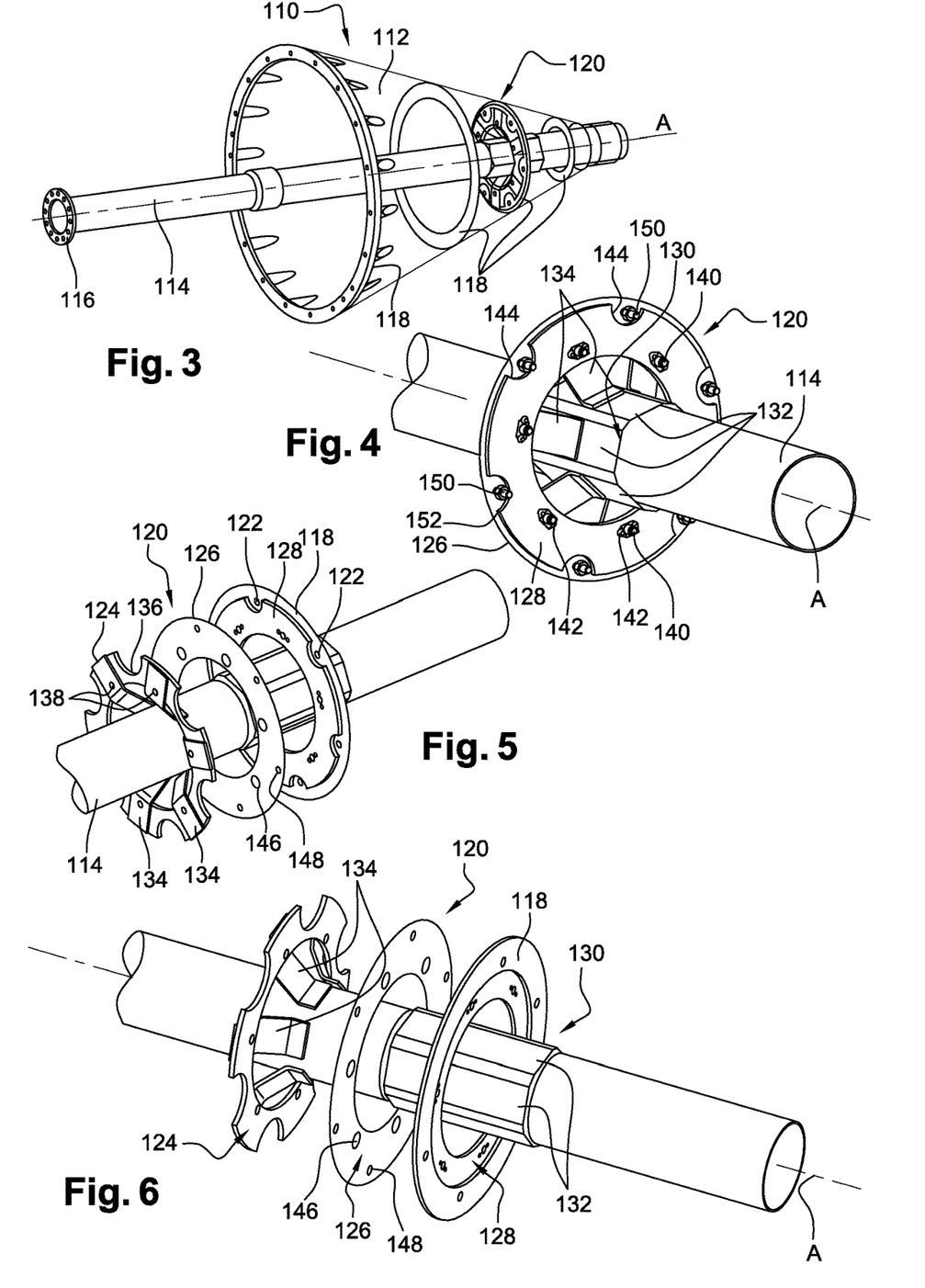
FIG. 3 is a perspective view of a unit according to the invention.
FIGS. 4 to 6 are perspective views of the centring means of the tube and the cone of the unit in FIG. 3, FIGS. 7 to 10 are schematic views in axial section, and certain ones are perspective views, of the centring means of the tube and the cone of the unit in FIG. 3, FIGS. 11 to 18 are perspective views of an assembly tool of the unit according to the invention, and represent the steps of an assembly method.
Figure 7:
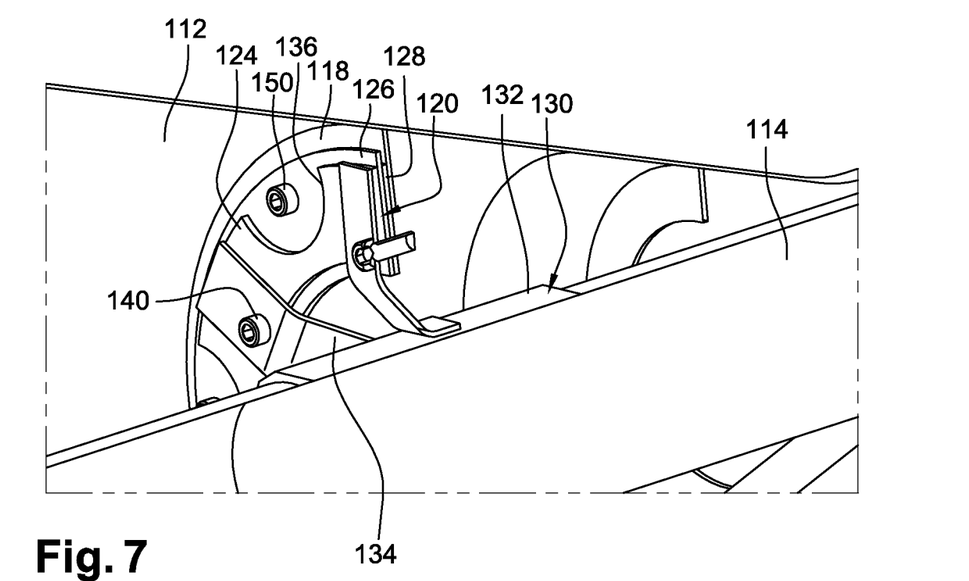
Figure 8:
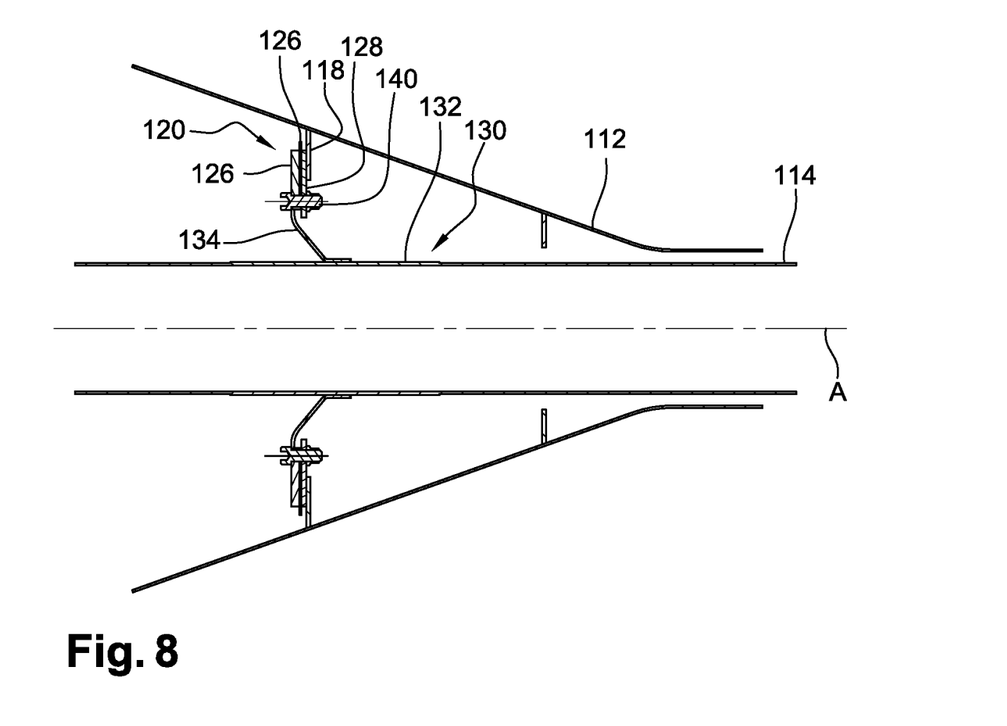
Figure 9:
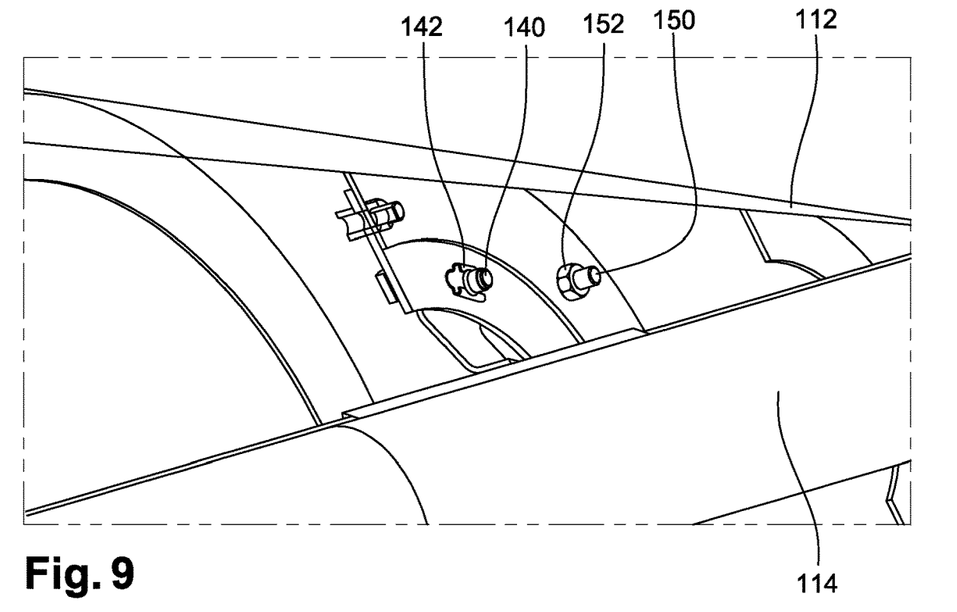
Figure 10:
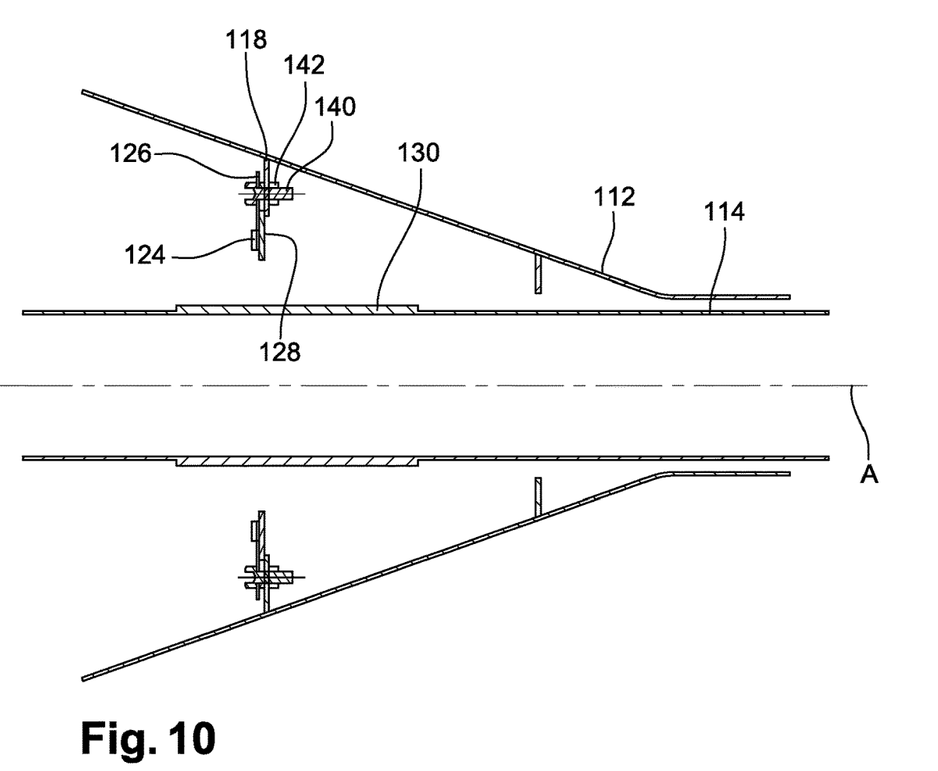

FIG. 3 represents a unit 110 as a whole, comprising an ejection cone 112 and a degassing tube 114 longitudinally traversing the cone and comprising a fixing flange 116 at its upstream end.

The cone 112 comprises a substantially conical or frusto-conical wall which is here reinforced by a series of inner annular stiffeners 118 longitudinally spaced apart from each other. In the example shown, there are four of these.

One of the stiffeners 118, situated next to the downstream end of the cone, is situated next to the downstream end of smaller diameter of the cone and carries the centring means 120 designed to co-operate with the complementary centring means 130 of tube 114.

The centring means 130 of the tube, better illustrated in FIGS. 4 to 10, comprise an annular row of, preferably flat, external support surfaces 132. In the example shown, the centring means 130 are formed by an allowance of the tube and have a polygonal, preferably hexagonal, peripheral form in cross section. It is conceivable that each side of the hexagon defines one of the aforementioned support surfaces, here six in number evenly distributed around the axis A. The centring means 130 are then integrally formed with the tube 114 in the example shown.

The stiffener 118 of the cone, which carries the centring means 120, comprises a flat annular wall extending substantially radially with respect to the axis A. This wall has a larger internal diameter than the external diameter of the tube 114. The stiffener 118 comprises an annular row of axial screw holes 122.

The centring means 120 comprise three discs 124, 126, 128 in the example shown.

Each disc 124, 126, 128 is designed to be traversed by the tube 114, and has a larger internal diameter than the external diameter of the tube 114.

The disc 124, known as upstream disc or first disc, carries an annular row of radial support tabs 134 on the faces 132 of the centring means 130 of the tube 114. The number of tabs 134 is preferably equal to the number of faces 132, and thus there are six in the present case.

The tabs 134, as well as the discs 124, 126, 128 are preferably formed out of metal. Each tab 134 comprises, for example, an element of sheet metal folded in order to substantially form a V. An arm radially external of the V is applied and fixed, for example by welding, to a face, here upstream, of the disc 124, and the other arm radially inside of the V is folded back downstream to extend substantially parallel to a face 132 and to be capable of entering into co-operation with it by support plane.

As shown in the drawings, the disc 124 comprises an annular row of through slots 136 in axial direction at its external periphery.

The disc 124 also comprises an annular row of holes 138 for screws 140 fixing the disc 124 to the disc 128. The holes 138 are here formed in the arms radially external of the tabs 134.

The disc 128, known as downstream disc or second disc, has an annular row of screw 140 holes, as well as plate nuts or rivet bushes 142 for screwing these screws.

The disc 128 also comprises an annular row of through slots 144 in axial direction at its external periphery.

The disc 126, known as intermediate disc or third disc, has a first annular row of screw 140 holes 146 and a second annular row of holes 148 for screws 150 fixing the disc 126 to the aforementioned stiffener 118, which traverses the holes 122.

The holes 146 are situated on a first centred circumference C1 on the axis of the disc 126, and the holes 148 are situated on a second centred circumference C2 of that axis, C2 being larger than C1.

The diameter of the holes 146 is larger than the diameter of the screws 140 so that, in the absence of screw tightening, the disc 126 can be moved in its plane, which is a plane substantially radial with regard to the axis of the tube. This degree of freedom or idle assembly allows the position of the disc 126, and thus of the cone 112, with regard to the tube 114, to be adjusted.

The slots 136, 114 have a similar function to the holes 146 in how they are dimensioned and positioned to allow the screws 150 to pass through and to allow relative displacements in the aforementioned radial plane between the discs 124, 128, on the one hand, and the disc 126 and the stiffener 118, on the other hand.

The heads of the screws 140 can be applied on the upstream face of the disc 124. The heads of the screws 150 can be applied on the upstream face of the disc 126 and can be screwed into the nuts 152 supported on the downstream face of the stiffener 124 or in the plate nuts or rivet bushes mounted in the holes 122 of the stiffener.

It is understood that the discs 124 and 128 are secured together by the screws 140. The disc 126 is inserted between the discs 124, 128 and secured to the stiffener 124 and thus the cone 112 by the screws 150.

Even in the case where the cone 112 has a non-axisymmetric form, the tube 114 is centred and supported in an optimal manner inside the cone by co-operation of the tabs 134 with the faces 132 of the tube. A misalignment of the axis of the tube with regard to the downstream end of the cone is allowed by the centring means 120 which, before the tightening of the screws 140, 150, can be positioned in the radial plane so that all the tabs 134 are supported on the faces 132. The tightening of the screws 140, 150 then allows the relative positions of the cone and the tube to be fixed in place.

FIGS. 11 to 22 show a tool for assembly of the unit on a turbine engine, as well as the steps of the assembly method.

The tool 160 mainly comprises:

a first ring 162 configured to be applied and fixed to an intermediate element of the ejection unit, itself fixed to a casing of the turbine engine, and also, in a sequenced manner, to be applied and fixed to the end of larger diameter of the cone, this first ring being configured to be traversed by the tube, a second ring 164 configured to be traversed by the tube and to be accommodated in the cone, struts 166 connecting the discs, which extended between the discs and are fixed to the latter, these struts being configured to be accommodated in the cone, and a third ring 168 configured to be traversed by the tube and to carry, in a detachable and sequenced manner, a tubular finger 170 comprising centring means 130' substantially identical to the centring means 130 of the tube, this third ring being fixed to the second ring by means allowing an adjustment of the misalignment of the axes of the second and third rings.

The first ring 162 is here formed by a flat wall, substantially radial. It comprises an annular row of holes 172 for screws fixing to the intermediate element of the ejection module, or at the downstream end of the cone, for example at its annular flange. It also comprises holes for fixing screws for struts 166.

The struts 166 are formed by bars here in a U-shape in cross section, of which the longitudinal ends are respectively fixed to the rings 162, 164. The struts 166 are evenly distributed around the axis A and are six in number in the example shown. They are inscribed into a frusto-conical surface and are capable of being engaged, with the rings 164, 168 in the cone 112.

The ring 164 comprises a first annular row of orifices 174, here in oblong form. These orifices are situated in the longitudinal extension of the bars at the point of the opening of the U of their section.

The ring 164 also comprises an annular row of through slots 176 in axial direction, situated at the external periphery of the ring.

The ring 164 also comprises a second annular row of holes for screws 178 carried by the third ring 168. These holes have a larger diameter than that of the screws 178 so that the ring 168 can, before tightening of the screws 178, be moved in a radial plane with regard to the ring 164, as described above.

Figures 11, 12:
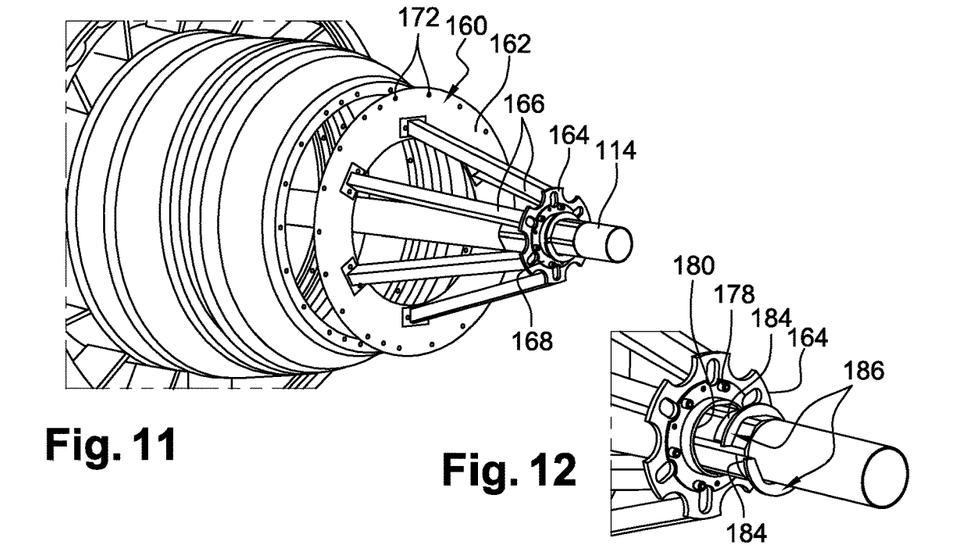
Figures 13, 14, 15:
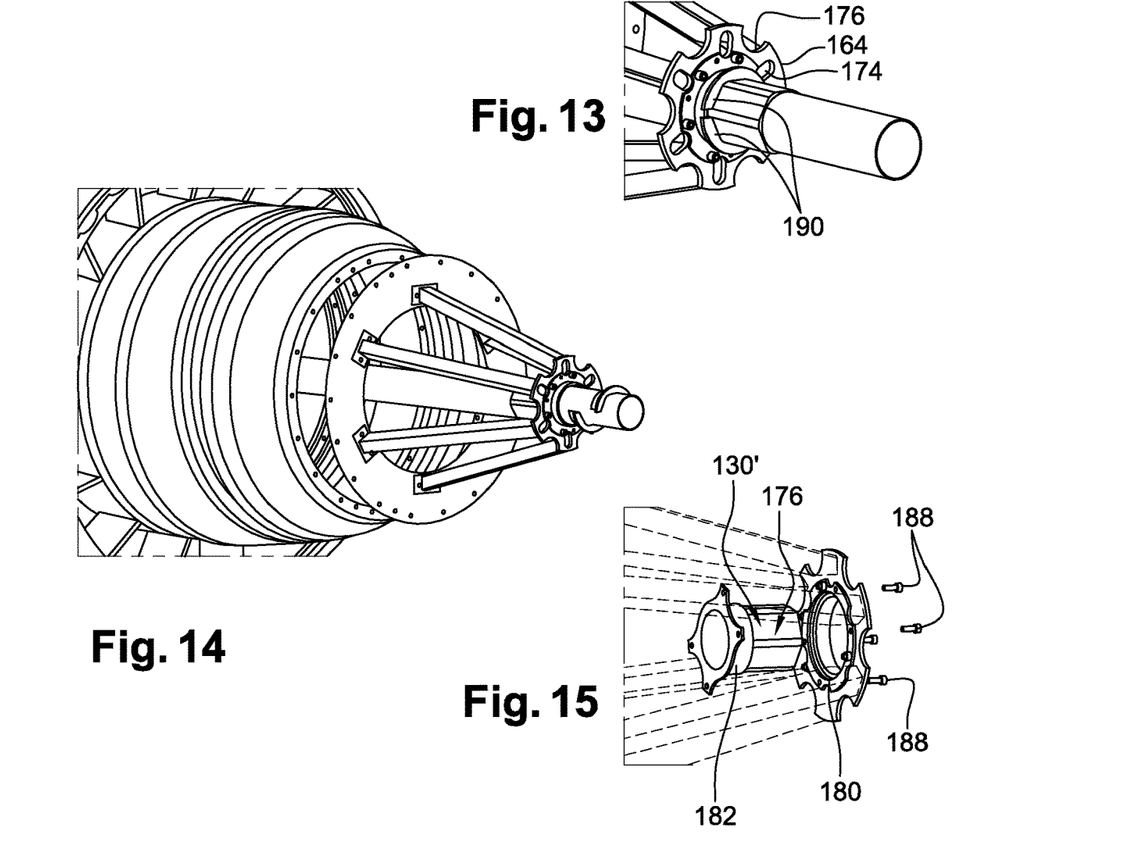

This ring 168 comprises an inner cylindrical centring surface 180 which is configured to co-operate with an external cylindrical surface 182 of the finger 170 (FIG. 15) and, in a sequenced manner, with an external cylindrical surface 184 of a tubular casing 186 (FIGS. 12 to 14).

As described above, the finger 170 is tubular and comprises a longitudinal portion, here upstream, carrying the face 182, and a longitudinal portion, here downstream, carrying the centring means 130' at the external hexagonal peripheral section. The finger 170 comprises, at its downstream end, an annular screw 188 retaining flange in the ring 128. It is also understood that the finger 170 is secured to the ring 128 by the screws 188, and that its radial position with regard to the ring 126 is adjustable by means of the screws 178.

The casing 186 is here sectioned and comprises two half-shells, of which the joint plane contains the longitudinal axis of the casing. The casing 186 comprises the external cylindrical surface 184 at its external peripheral and, at its inner peripheral, a face of polygonal, preferably hexagonal, form in cross section, which is complementary to that of the centring means 130, 130'. The casing also comprises an annular collar 190 at its downstream end.

Figure 16:
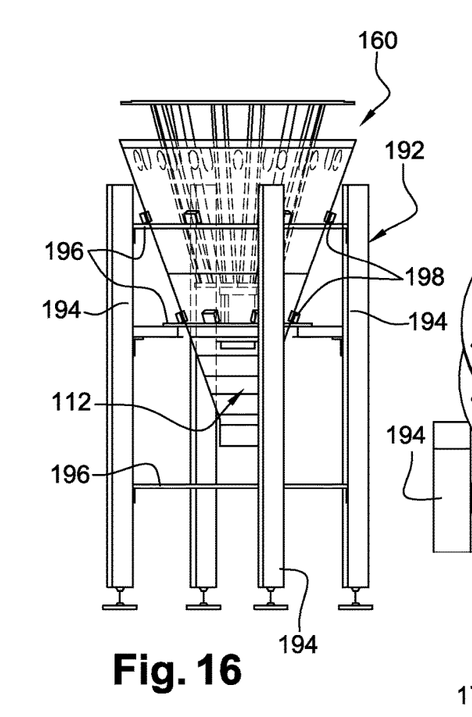
Figure 17:
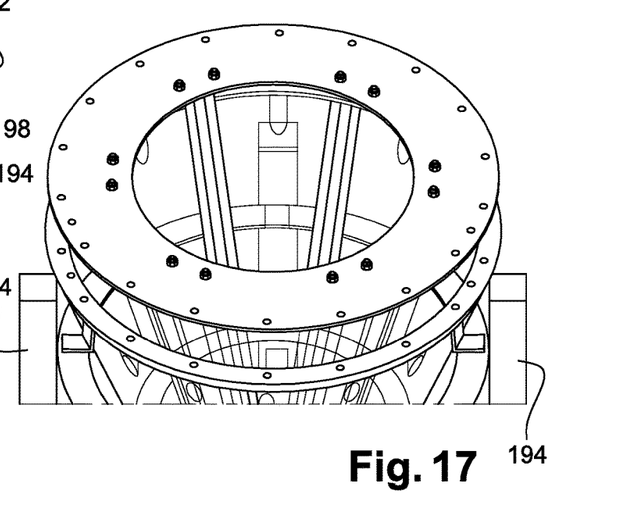
Figure 18:
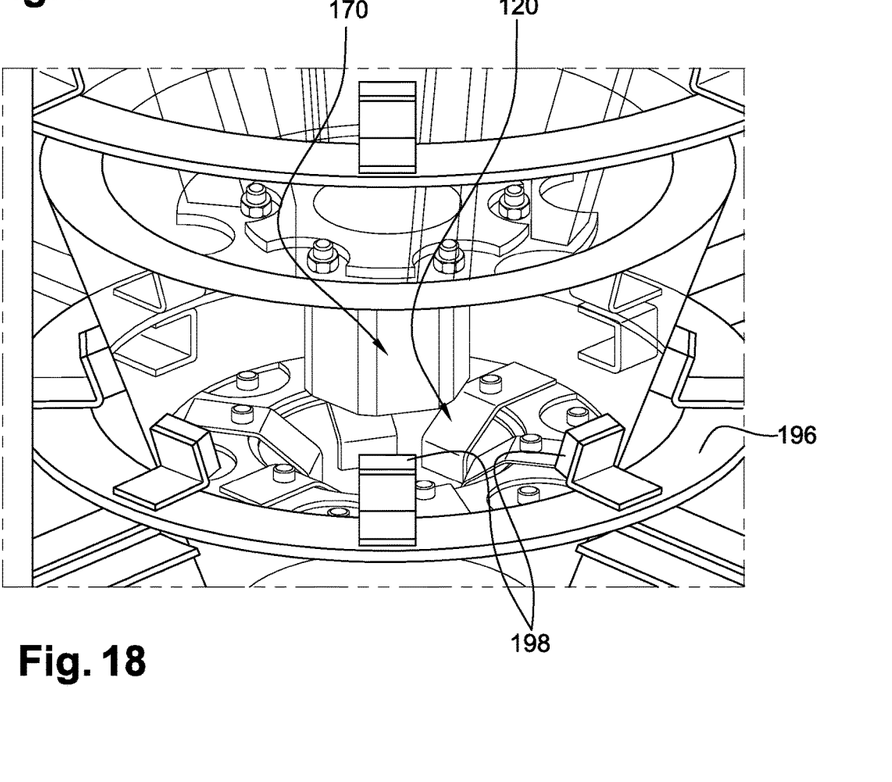
Figure 19:
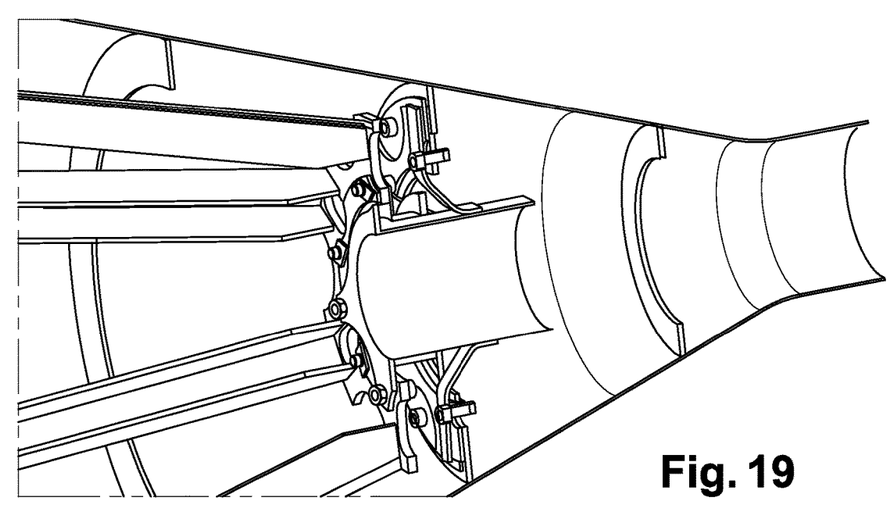
FIGS. 19 to 22 are schematic views in axial section, and certain ones are perspective views, of the means of adjustment of the tool in FIGS. 11 to 18, inserted into the ejection cone.
Figure 20:
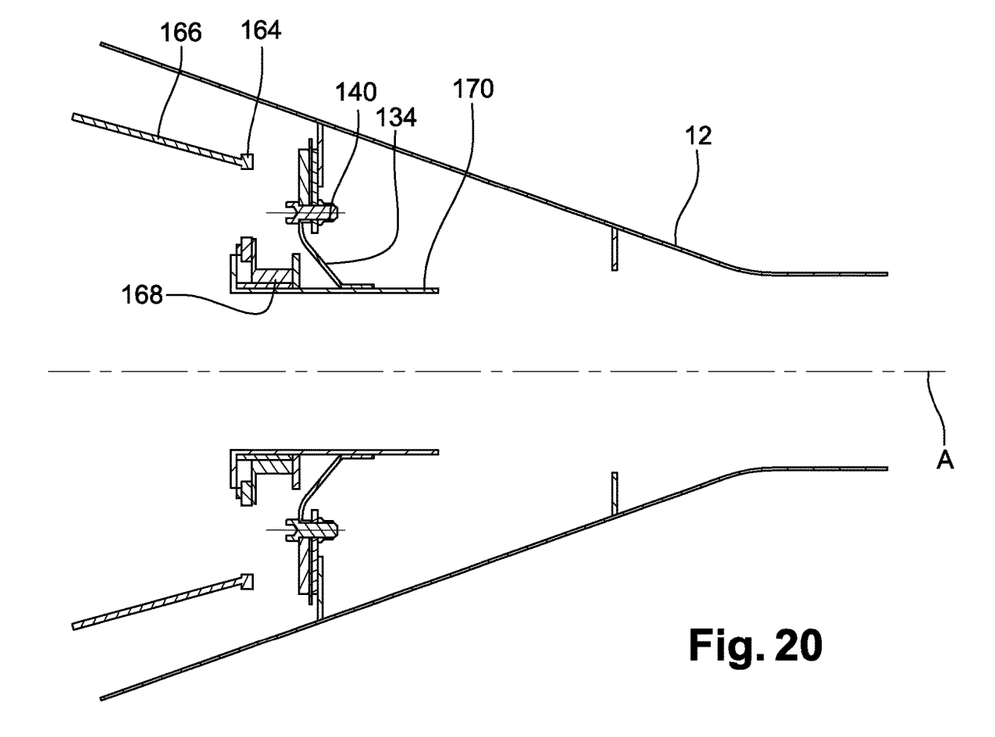
Figure 21:
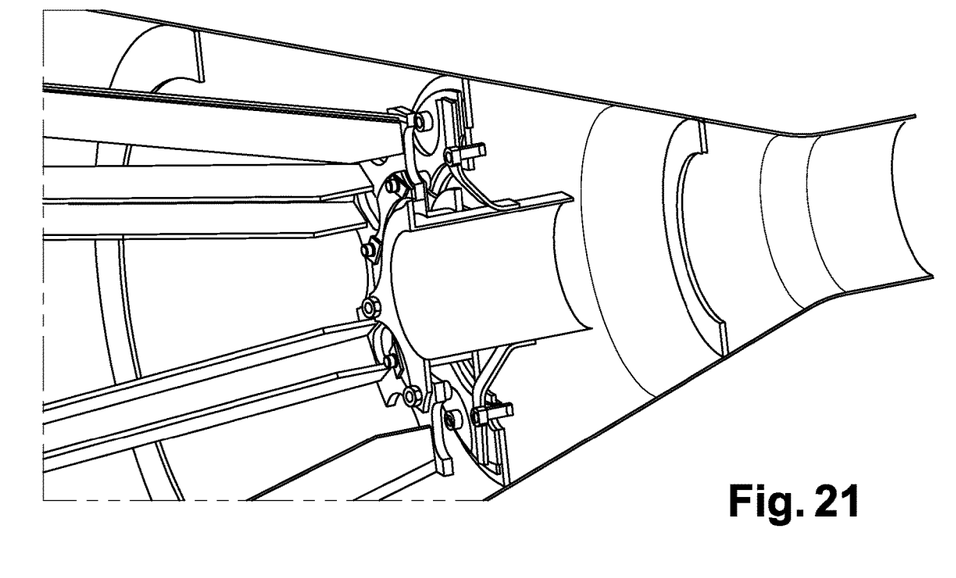
Figure 22:
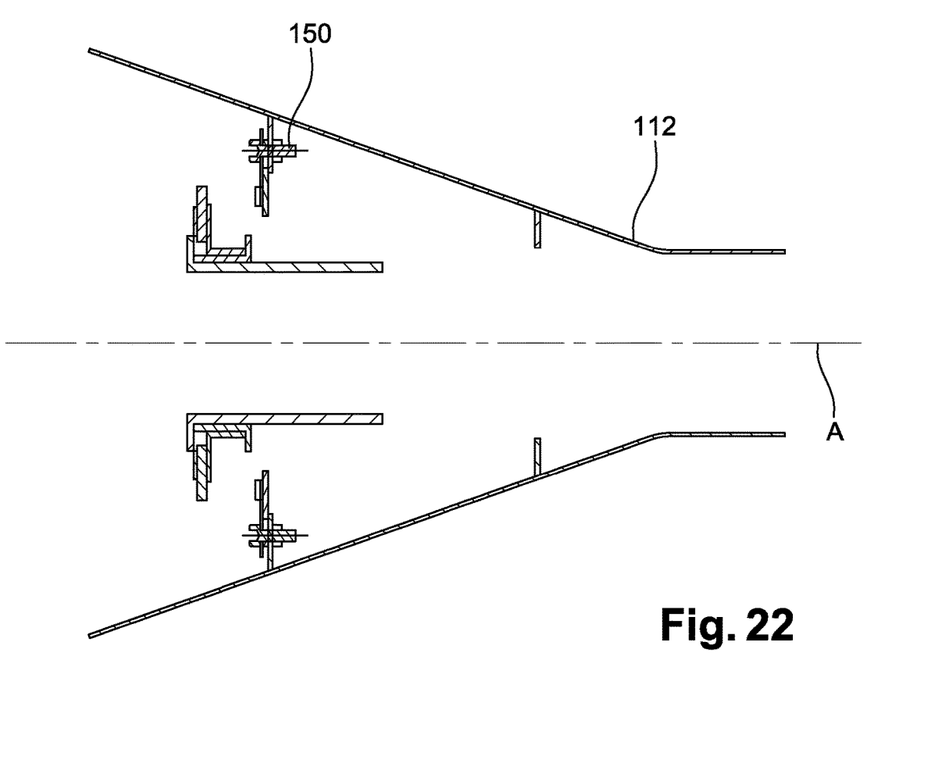

The tool can also comprise a supporting frame 192 of the cone upon insertion of the arrangement formed by the rings 162, 164, 168 and the struts 166 in the cone, as ca be seen in FIGS. 16 to 18.

This frame 192 comprises four substantially vertical supports 194 supporting two or three substantially horizontal rings 196 designed to support and maintain the cone by supporting means like the pads 198. As can be seen in the drawings, the cone is mounted in the frame 192 so that its longitudinal axis extends substantially vertical. The pads are supported on the external frusto-conical surface of the cone.

Figure 23:
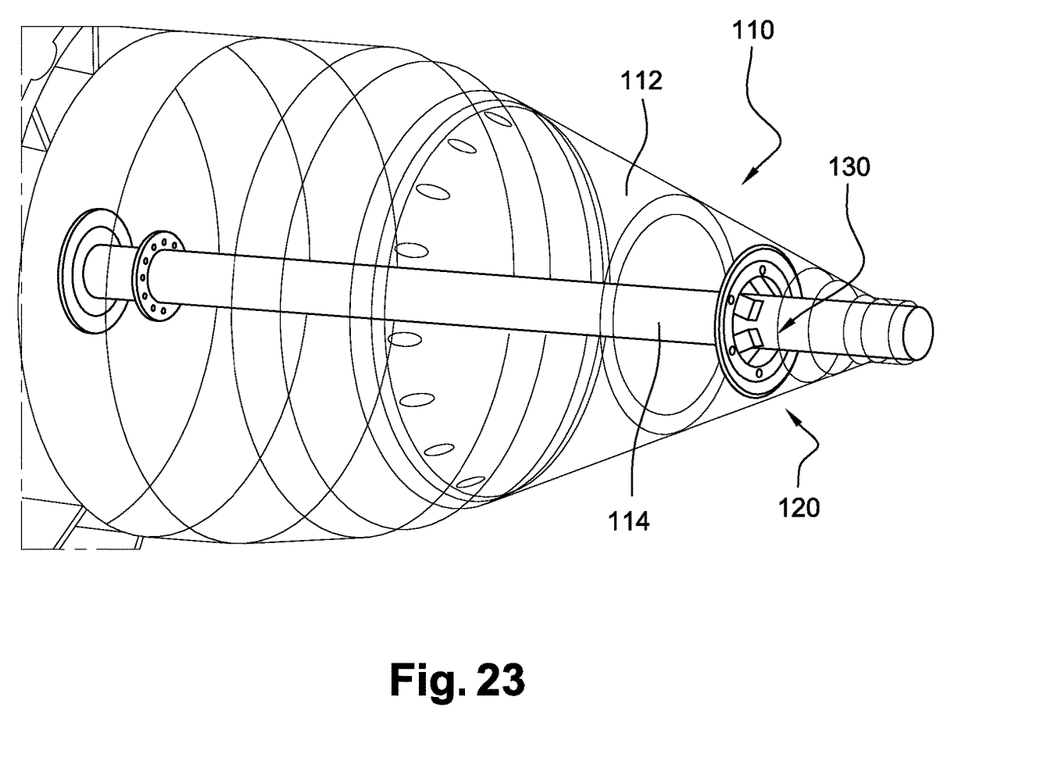
FIG. 23 is a perspective view of a downstream end of a turbine engine.

The usage of the tool 160 and the assembly of the unit 110 of FIG. 23 will now be described with reference to FIGS. 11 to 22.

The arrangement formed by the rings 162, 164, and 168 and the struts 166 is pre-assembled, the fixing screws 178 of the rings 164, 168 not being tightened.

The tube 114 is fixed to the element of the turbine engine by its downstream flange then the ring 162 of the tool is fixed to the intermediate element of the turbine engine (FIG. 11). The tube then traverses the rings 164, 168 of the tool.

As can be seen in FIGS. 11 to 13, the casing 186 is inserted between the tube and the ring 168, and more exactly between the centring means 130 of the tube and the inner cylindrical surface 180 of the ring 168.

This operation allows the ring 168 to be correctly positioned with regard to the tube, meaning that the ring 168 is centred in the tube. The fixing screws 178 of the rings 164, 168 are then tightened to fix them into this relative position.

The casing 186 is then removed (FIG. 14). The tool 160 can then be detached from the turbine engine. It was used to locate the relative position of the centring means 130' with regard to the intermediate element of the ejection module of the turbine engine on which the cone must be fixed. The finger 170 is fixed to the ring 168, as shown in FIG. 15.

The cone 112 is arranged in the frame 192, as shown in FIG. 16, then the adjusted tool 160 is accommodated in the cone until the finger 170 co-operates with the tabs 134 of the centring means 120 and the ring 162 is supported on the downstream end or the flange of the cone (FIGS. 17 and 18). The tool can also be fixed to the cone.

The co-operation of the finger 170 with the tabs 134 allows precise and relative positions corresponding to the optimal centring positions of the tube to be charged onto the tabs. It is therefore easily understandable that the tool serves as a means of locating but also adjusting the relative positions between the two systems.

The fixing screws 140, 150 of the discs can then be tightened as described above, to fix the relative positions of the discs, and thus the centring tabs 134 with regard to the cone, in place. For that, an operator can have access to the heads of the screws 140, 150 by the orifices 174 and slots 176 of the tool 160.

The tool 160 is thus detached and removed from the cone, which can be fixed to the turbine engine. The cone is mounted around the tube, so that the centring means 120, 130 co-operate together, then the cone is fixed by its upstream flange to the intermediate element of the ejection unit of the turbine engine (FIG. 23).

The invention claimed is:

1. An ejection cone for a turbine engine of an aircraft, the ejection cone having an extended form and comprising first fixing means to an element of the turbine engine at a first longitudinal end, the ejection cone also comprising at an inner periphery of the ejection cone and at a distance from said first longitudinal end second centering means configured to co-operate with first centering means of a degassing tube of the turbine engine designed to traverse said ejection cone, the ejection cone comprising at least one annular stiffener at the inner periphery, said second centering means being fixed in a detachable manner to said at least one annular stiffener, wherein said second centering means comprise an annular row of tabs configured to be supported radially on said first centering means, wherein said tabs are carried by a first disc which is fixed to a second disc, a third disc being inserted and squeezed between said first and second discs and being fixed to said at least one annular stiffener, said first, second and third discs extending around a longitudinal axis of the cone.

2. The ejection cone according to claim 1, wherein said first and second discs are fixed together by screws which traverse first holes or slots of said third disc, and said third disc is fixed to said at least one annular stiffener by screws which traverse second holes or slots of said second disc inserted between said third disc and said at least one annular stiffener, said first and second holes or slots each having larger transversal dimensions than those of said corresponding screws in order to allow for relative displacements in a radial direction between said first and second discs, on the one hand, and said third disc and at least one annular stiffener, on the other hand, wherein the transversal dimension is a dimension in a transverse plane, said transverse plane being a plane perpendicular to an axis of revolution of the ejection cone.

3. The ejection cone according to claim 2 wherein each said transversal dimension is a corresponding diameter of each of said first and second holes or slots.

4. A unit of a turbine engine of an aircraft, comprising an ejection cone according to claim 1 and a degassing tube for a turbine engine of an aircraft, the degassing tube having an extended form and comprising second fixing means to an element of the turbine engine at a second longitudinal end, the degassing tube also comprises at an external periphery of the degassing tube and at a distance from said second longitudinal end first centering means configured to co-operate with second centering means of an ejection cone of the turbine engine designed to be traversed by said degassing tube, wherein said first centering means are formed by raised surfaces of the degassing tube that extend annularly around an outside of the degassing tube.

5. The unit according to claim 4 wherein the raised surfaces of the degassing tube have a polygonal cross section.

* * * * *